United States
Lierke

[11] 3,955,880
[45] May 11, 1976

[54] INFRARED RADIATION MODULATOR
[75] Inventor: Ernst-Günther Lierke, Eschborn, Germany
[73] Assignee: Organisation Europeenne de Recherches Spatiales, France
[22] Filed: July 15, 1974
[21] Appl. No.: 488,469

[30] Foreign Application Priority Data
July 20, 1973  Germany............................ 2336930

[52] U.S. Cl.............................. 350/160 R; 356/112
[51] Int. Cl.²........................................... G02F 1/38
[58] Field of Search....................... 350/160 R, 162; 356/112, 106 IS

[56] References Cited
UNITED STATES PATENTS
3,659,919   5/1972   Williams........................ 356/112 X OTHER PUBLICATIONS
"Spectrometer for Laser Analysis" *NBS Tech. News Bltn*, Mar. 1964, pp. 46–47.
"Rapid Scanning of Spectral Line Profiles Using An Oscillating Fabry–Perot Interfeometer", by Copper, et al. *Jrnl of Sci. Instruments*, Vol. 40, No. 9, 9/63 pp. 433–437.

*Primary Examiner*—Vincent P. McGraw
*Attorney, Agent, or Firm*—Hill, Gross, Simpson, Van Santen, Steadman, Chiara & Simpson

[57] ABSTRACT

An infrared radiation modulator comprising three parallely arranged interferometer plates, forming two successive slits or cavities therebetween for passing the infrared radiation to be modulated. The width of said slits is periodically varied by the oscillations of the central interferometer plate while the two outer plates remain stationary, a positive variation of the width of one of the slits corresponding at any time to a negative variation of the width of the other slit. A particularly suitable material for the interferometer plates is monocrystalline doped cadmium telluride having a high resistivity and a limited absorption rate for infrared radiation. A very precise alignment of the interferometer plates and an accurate adjustment of the width of the slits therebetween can be achieved by using a wedge-arrangement comprising three radially displaceable wedges disposed at angles of 120° for adjusting the parallelism of the plates and the width of the slits formed between the central plate and the two outer plates when in their normal (rest) position, said adjustment being made independently for each slit. In a particular embodiment, the interferometer plates are made of a material having a high resistance and having marginal zones overlaid with metal layers forming in each slit three uniformly distributed capacitors. By varying the capacitance of said capacitors the width of the interferometric slits or the parallelism of the plates can be adjusted.

13 Claims, 8 Drawing Figures

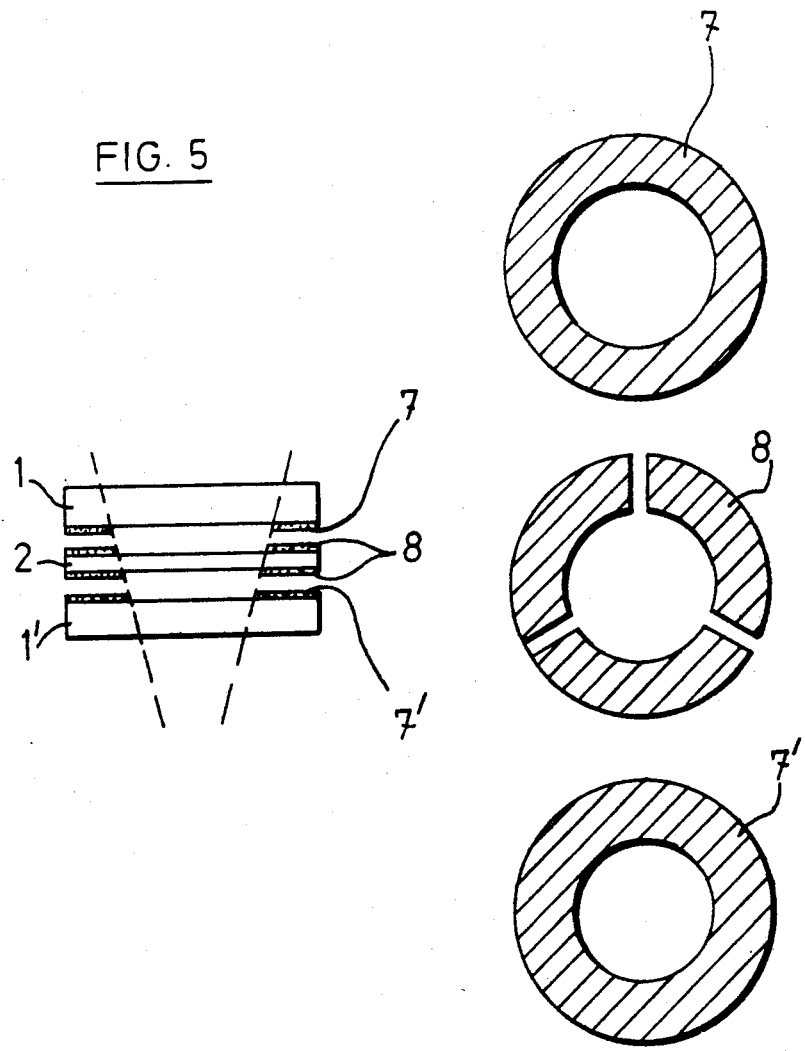

INFRARED RADIATION MODULATOR

The present invention relates to an infrared radiation modulator based on the principle of the Fabry-Perot interferometer.

The simplest modulator is a mechanical type using a rotating disc or vibrating fork. Though modulators of this type provide 100% modulation, they have the drawbacks of requiring a relatively high driving power energy and of having a relatively high wear. Other drawbacks are their mass and weight for the rotating disc type and their limited receiving area for the vibrating fork type.

Another modulator has been proposed which uses a Fabry-Perot interferometer. The latter consists in principle of two plane and parallel reflecting plates. The transmission through a Fabry-Perot etalon at a given wavelength depends on the distance between the plates. Modulation of the transmitted beam is made by varying the distance between the plates at the mechanical resonance frequency. Driving means are provided to cause the interferometer plates to vibrate at said mechanical resonance frequency. Such a modulator is disclosed in a publication entitled: "Survey of possibilities of nonmechanical modulation of infrared radiation and consideration of their usefulness for satellite application" issued by European Space Research Organisation (October 1970).

In a known infrared radiation modulator of this kind, the infrared radiation to be modulated passes through two interferometer plates with coplanar surfaces forming a slit therebetween and which are attached to flexible resonators, the width of said slit being periodically varied in response to the mechanical resonance vibrations. A suitable material for these interferometer plates is germanium with a relatively satisfactory transmission factor for infrared radiations over the wavelength range from 2 $\mu$m to 16 $\mu$m and a refractive index producing optimum results in the modulation of convergent monochromatic radiation. However, in some applications, for instance when the working temperature is relatively high or when the interferometer plates should have a greater thickness, the absorption value of germanium reaches non acceptable levels (10 ×20%/cm) and therefore materials with better transparence values for infrared radiation have to be selected.

But this choice is not easy, as it is known that materials having a greater transmission factor than germanium for infrared radiation have a relatively reduced refractive index and do produce a relatively poor modulation in a Fabry-Perot interferometer.

It is the object of the present invention to make it possible to manufacture interferometer plates from materials having a refractive index and an absorption capability comparatively lower than those of germanium for infrared radiation, thereby to achieve a higher modulation rate of the incident radiation and yet at higher working temperatures.

According to the invention the modulator comprises three parallely arranged interferometer plates, forming two successive slits or cavities therebetween for passing the infrared radiation to be modulated. The width of said slits is periodically varied by the oscillations of the central interferometer plate while the two outer plates remain stationary, a positive variation of the width of one of the slits corresponding at any time to a negative variation of the width of the other slit. A particularly suitable material for the interferometer plates is monocrystalline doped cadmium telluride having a high resistivity and a limited absorption rate for infrared radiation.

A very precise alignment of the interferometer plates and an accurate adjustment of the width of the slits therebetween can be achieved by using a wedge-arangement comprising three radially displaceable wedges disposed at angles of 120° for adjusting the parallelism of the plates and the width of the slits formed between the central plate and the two outer plates when in their normal (rest) position, said adjustment being made independently for each slit.

Another feature of the invention is that the interferometer plates are made of a material having a high resistance and having marginal zones overlaid with metal layers forming in each slit three uniformly distributed capacitors. By varying the capacitance of said capacitors the width of the interferometric slits or the parallelism of the plates can be adjusted. Technically, there is no difficulty to subdivide the metallic layers vaporized onto the marginal zones with great precision into a series of identical areas, such that the adjustment of the parallelism of the plates and the optimum value for the slit width can be made by adjusting accurately the capacitors formed by said metallic layers to the same capacitance. The period of time required for such an adjustment is only a fraction of the time needed with the usual devices such as a laser arrangement.

After their interconnection, the metallic layers acting as electrodes for the measuring capacitors can be used for stimulating the resonance of the intermediate interferometer plate and for completing a feedback circuit.

The invention further proposes a filter layer to be formed on one or both outer surfaces of the interferometer plates for the wavelength range of the radiation to be modulated. Previously, such a filter had to be inserted separately in the path of the infrared beam and it induced unnecessary losses by reflection and absorption.

In the drawings:

FIG. 1 schematically represents in cross-section an infrared radiation modulator according to the invention;

FIG. 2 graphically shows the interdependence between the transmission for infrared radiation and the spacing of the plates in a known Fabry-Perot interferometer;

FIG. 3 graphically shows the modulation amplitude in function of the bandwidth of the incident radiation for an optimum adjustment of the plates at a wavelength of 15 $\mu$m.

FIG. 4b is an elevational view of the resonance vibrations inducing device of FIG. 4a;

Figure 6:
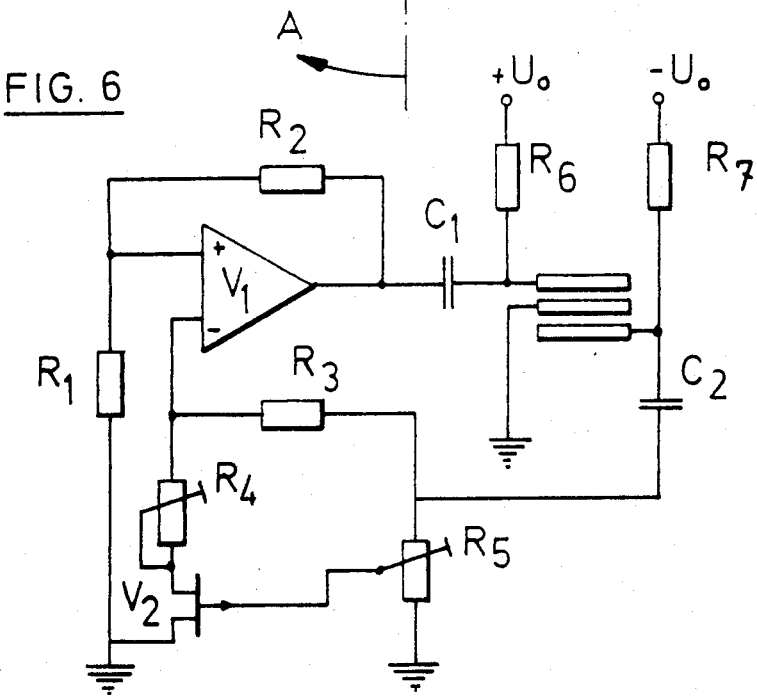
Figure 7:
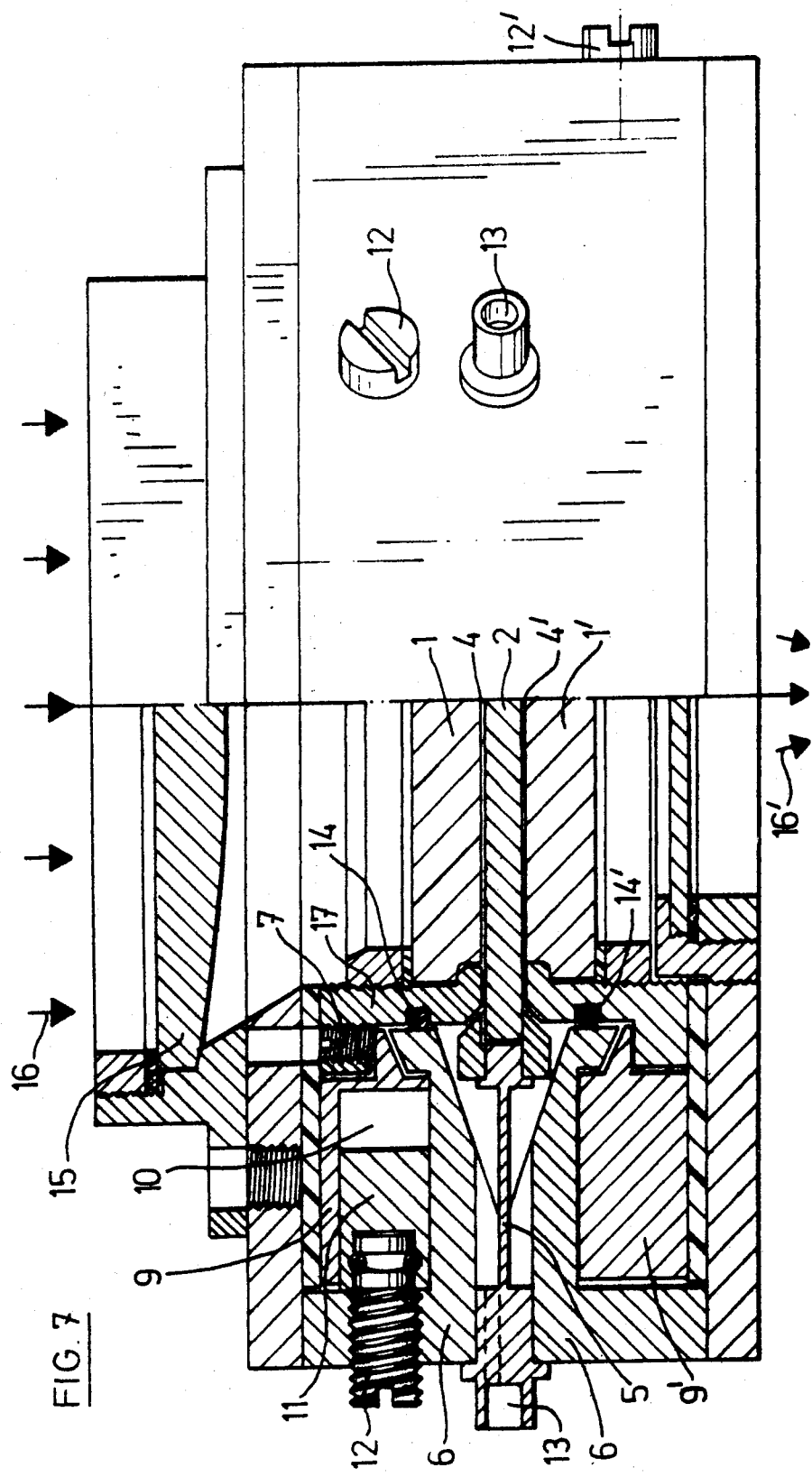

FIG. 5 schematically represents in sectional (left) and in elevational (right) views the arrangement of the metal layers used for adjusting and generating the vibrations in the infrared modulator;

FIG. 6 illustrates the connection for the capacitive generation of vibrations in the modulator of FIGS. 1 to 5 with a capacitive feedback;

FIG. 7 is a side-view, partially in radial section, of a complete infrared modulator of the invention.

Figure 1:
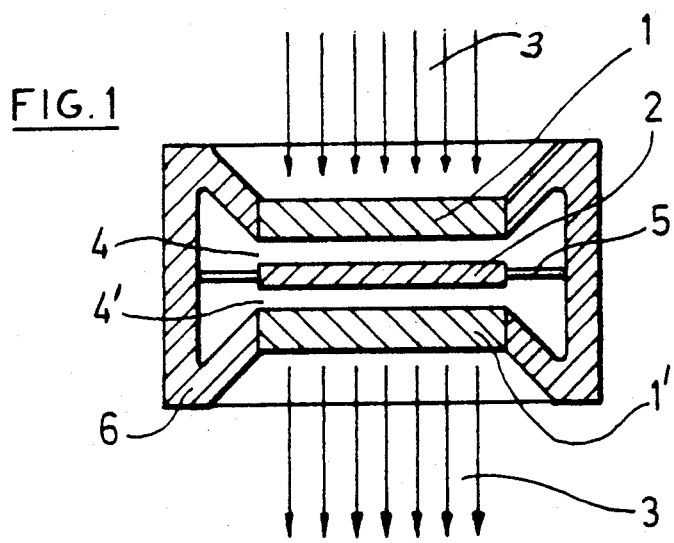

The basic assembly of the infrared radiation modulator of the invention is shown in FIG. 1. It comprises three interferometer plates 1, 1' and 2, of which the outer ones (1, 1') are stationary while the central plate (2) is mounted in a box 6 in such a way that it may be caused to vibrate the slits formed between the interferometer plates are designated as 4 and 4' (left) and the incident infrared radiation follows the direction of the arrows 3. In the infrared modulator shown in FIG. 1, the slits 4 and 4' are adjusted in the normal (rest) position respectively to $\frac{3}{8}\lambda^*$ and $\frac{5}{8}\lambda^*$, $\lambda^*$ being the mean wavelength of the band of the infrared radiation to be modulated.

Figure 2:
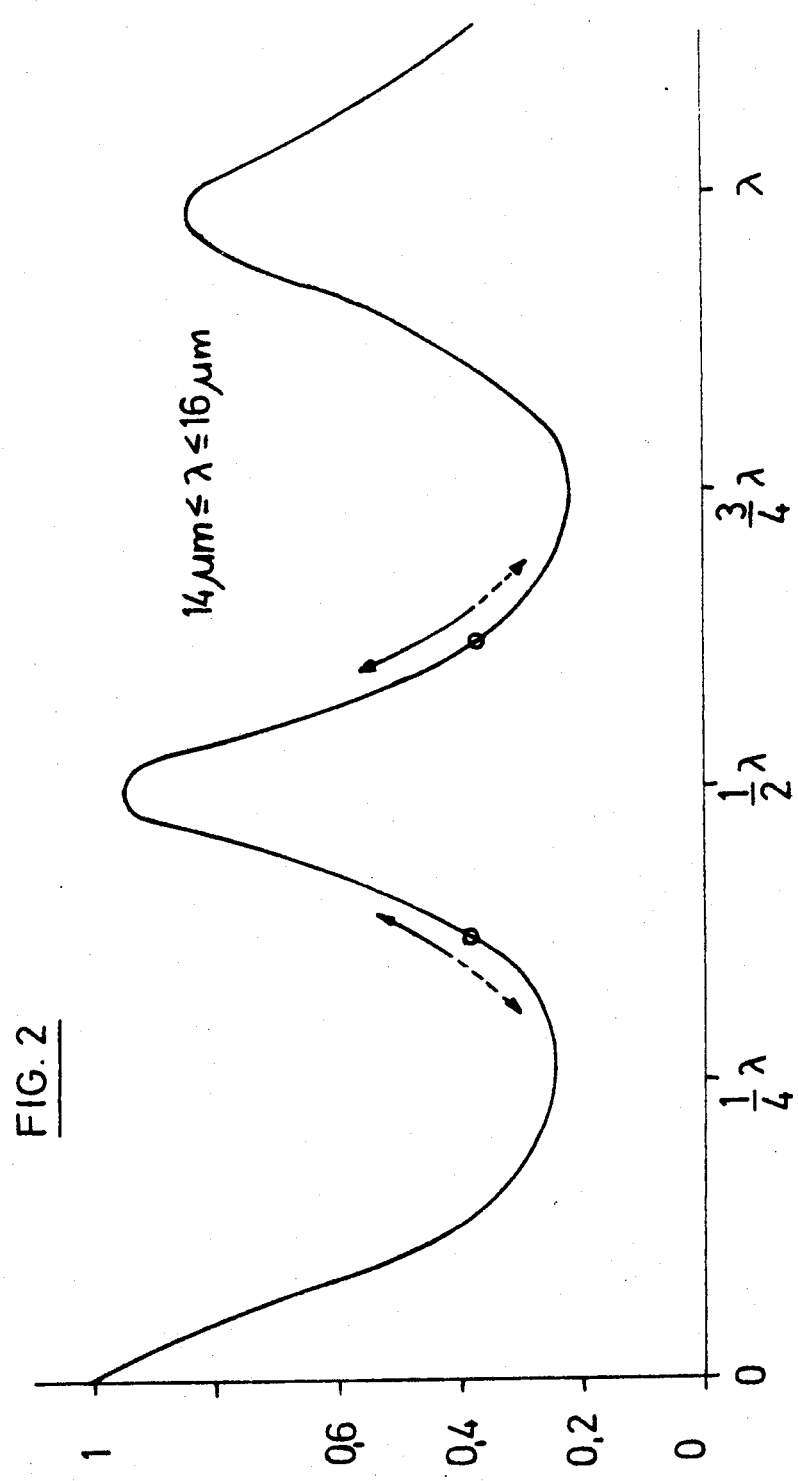

These two working points, shown in FIG. 2, will give a mean transmission for the infrared radiation. Now, if the central plate 2, while the outer plates 1, 1' remain stationary, is periodically caused to vibrate about its normal position, these oscillations will modify correspondingly the width of slits 4 and 4'. The transmission factor of the two slits 4, 4' for the mean wavelength $\lambda^*$ thereby varies as shown in FIG. 2 between a maximum and a minimum limit, raising the interferometric effect to the second power. The optimum modulation is obtained for a parallel monochromatic infrared radiation. In this case, the working values (cf. FIG. 2) may be adjusted for a larger width of the slits at proximate points $(2n-1) \lambda^*/8$, $n$ having the value 1, 2, 3, . . . .

Figure 3:
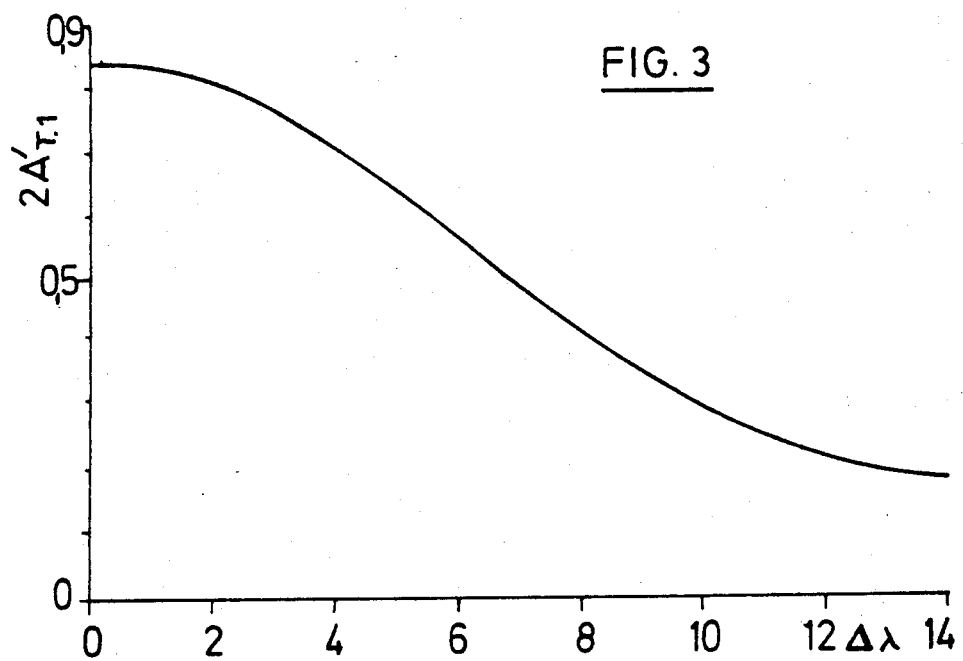

As apparent from the diagram of FIG. 3, with non-monochromatic radiation having a mean wavelength $\lambda^*$, the effective modulation $2 A'_{T,1}$ is progressively decreasing with the increase of the bandwith $\Delta\lambda$.

The reduction of the effectiveness of the modulation is substantially greater for wider slits and for that reason, only the working regions indicated on the second and the third waves of the transmission curve will give favourable results.

Figure 4A:
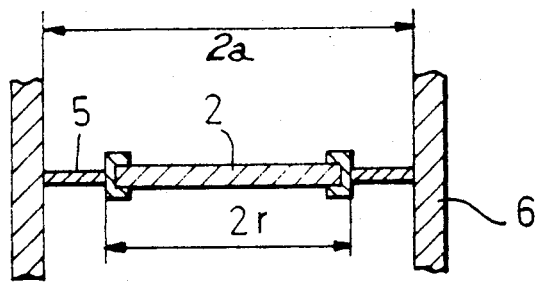
FIG. 4a is a schematic section view along line A-A on FIG. 4b, illustrating the resonance vibrations inducing device of the modulator of FIG. 1.
Figure 4B:
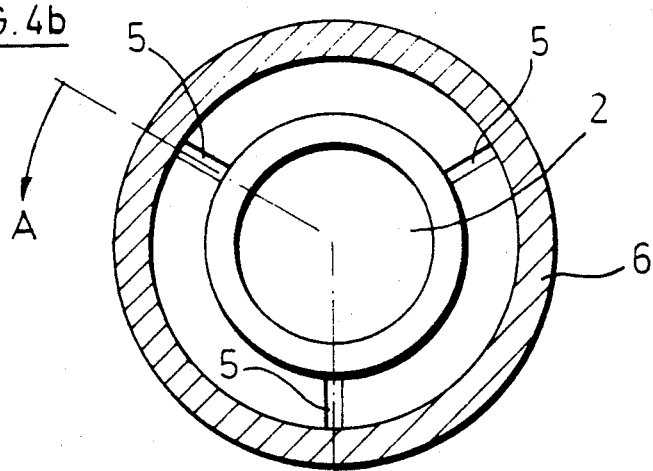

The FIGS. 4a and 4b illustrate an example of suspension for the central interferometer plate 2 to the rigid external frame 6 of the modulator by means of a three-armed flexural vibrator 5. The central interferometer plate 2 is oscillating with an amplitude of about $\lambda^*$ around its normal (rest) position, the plate itself being rigid while the flexible elements 5 only are submitted to the flexions.

FIG. 5 illustrates the arrangement and the forms of the metal layers 7, 7', 8 in the marginal zones of the interferometer plates 1, 1', 2. The plates 1, 1', 2 are made of a material having a high resistance, preferably of monocrystalline doped cadmium telluride. The metal layers 7, 7', 8, deposited by vacuum vaporization permit the capacitive adjustment of the slit width to be easily made and a capacitive excitation of vibrations to be realized with a capacitive feedback.

When the metal layers 7, 7' on the outer interferometer plates 1, 1' are grounded, the adjustment of the slit width can be effected by means of the plate capacitors formed by the outer metal layers 7, 7' and the metal layer 8 of the central interferometer plate 2, subdivided in three segments having identical areas. The optimum adjustment of the interferometer plates 1, 1', 2 is realized when the three partial capacitances of each slit are identical and correspond to the nominal value. Then the segments of the metal layer 8 are interconnected and grounded, and the capacitive resonance excitation of the vibration can be obtained by the circuit arrangement of FIG. 6 through outer plate 1 and the capacitive feedback through outer plate 1'. With this arrangement the amplitude of the width variation of the slits can be adjusted to an optimum value of about $\lambda^*/7$ by combining the positive and negative feedback at the input of an operational amplifier.

FIG. 7 represents an exemplary embodiment for an infrared modulator according to the invention. The essential part of this modulator comprises the interferometer plates 1, 1', 2, forming the adjustable slits 4 and 4' therebetween. The central interferometer plate 2 is fixed to the rigid external frame 6 of the modulator with three rod-like flexural resonators 5. The coarse adjustment of the position of the outer plates 1 and 1' relative to the central plate 2 may be effected by means of three fine threaded screws 7, disposed at angles of 120°. The clamping-chucks 17 of the plates 1, 1' are supported upon ring 9, 9' which is axially displaceable relative to the external frame 6 by means of three wedges 11 having a conicity of about 1°, moving in radial grooves 10. The fine axial adjustment of the interferometer slits 4, 4' is realized by means of three fine threaded screws 12 which move the three wedges 11 in their radial grooves 10, the supporting ring 9, 9' moving axially to establish a three-point adjustment. The air inside the modulator is evacuated through a pump aperture 13 to approximately $10^{-4}$Torr. in order to assure highly uniform resonance vibrations. The inner space of the modulator is hermetically sealed by means of two insulating rubber fittings 14. The vibration excitation of the modulator is realized as described with reference to FIGS. 5 and 6.

The illustrated embodiment comprises a focusing lens 15 to focus the incident infrared radiation 16, after passage through the modulator to an infrared radiation detector (not shown), as indicated by the arrows 16'.

What is claimed is:

1. An infrared radiation modulator comprising three parallely arranged interferometer plates made of a material having a limited absorption rate in the wavelength region of the radiation to be modulated, said interferometer plates forming two successive interferometric slits therebetween for passing the radiation to be modulated, the two outer plates of said three interferometer plates being stationary, and the central plate being suspended to a flexural resonator such that the width of said slits is periodically varied, the interferometer plates being comprised of monocrystalline doped cadmium telluride (CdTe) having a high resistivity and a limited absorption rate for infrared radiation.

2. The infrared radiation modulator of claim 1, wherein the interferometer plates have the shape of circular discs and the modulator comprises three radially displaceable wedges disposed at angles of 120° for adjusting the parallelism of the plates and the width of the slits formed between the central plate and the two outer plates when in their normal (rest) position, said adjustment being made independently for each slit.

3. The infrared radiation modulator of claim 1, wherein the interferometer plates have the shape of circular discs and are made of a material having a high resistance, said plates having marginal zones which are out of the path of the incident radiation, said marginal zones being overlaid with metal layers forming three uniformly distributed capacitors in each interferometric slit, the variation of the capacitance of said capacitors serving to adjust the width of said slits or the parallelism of said plates.

4. The infrared radiation modulator of claim 3, wherein the inner surfaces of said interferometer plates in said marginal zones are overlaid with layers of an electrically conductive material deposited by vacuum vaporization, and wherein there is provided means to apply a static and an alternating voltage to the conductive layers of one of said interferometric slits, to capacitively produce the excitation of the resonance of said flexural resonator, and means to apply a static bias potential to said layers of the other plate to establish a feedback voltage.

5. The infrared radiation modulator of claim 4, wherein at least one of said conductive layers in each slit, in the marginal zone of said central interferometer plate is subdivided into three segments having identical areas, said segments being disposed at angles of 120° and are usable as capacitors for adjusting the position of the interferometer plates.

6. The infrared radiation modulator of claim 1, wherein one or both outer surfaces of the interferometer plates have a vaporized filter layer thereon for the range of wavelengths of the radiation to be modulated.

7. An infrared radiation modulator comprising a frame, three parallely arranged inteferometer plates made of a material having a limited absorption rate in the wave-length region of the radiation to be modulated, said interferometer plates forming therebetween two successive interferometric gaps adapted for passing the radiation to be modulated, the two outer plates of said three interferometer plates being fixedly connected to the frame, the central plate being connected to the frame through a flexural resonant vibrator having a resonance frequency, and driving means to cause said resonant vibrator to vibrate at resonance frequency, thereby to cause the gaps to be periodically varied at said resonance frequency.

8. The infrared radiation modulator of claim 7, wherein the interferometer plates are comprised of monocrystalline doped cadmium telluride (CdTe) having a high resistivity and a limited absorption rate for infrared radiation.

9. The infrared radiation modulator of claim 7, wherein the interferometer plates have the shape of circular discs and the modulator comprises three radially displaceable wedges disposed at angels of 120° for adjusting the parallelism of the plates and the width of the gaps formed between the central plate and the two outer plates when in their normal (rest) position, said adjustment being made independently for each gap.

10. The infrared radiation modulator of claim 7, wherein the interferometer plates have the shape of circular discs and are made of a material having a high resistance, said plates having marginal zones which are out of the path of the incident radiation, said marginal zones being overlaid with metal layers forming three uniformly distributed capacitors in each interferometric gap, the variation of the capacitance of said capacitors serving to adjust the width of said gaps or the parallelism of said plates.

11. The infrared radiation modulator of claim 10, wherein the inner surfaces of said interferometer plates in said marginal zones are overlaid with layers of an electrically conductive material deposited by vacuum vaporization, and wherein said driving means comprise means to apply a static and an alternating voltage to the conductive layers of one of said interferometer plates, to capacitively produce the excitation of the resonant vibration of said flexural vibrator, and means to apply a static bias potential to said layers of the other plate to establish a feedback voltage.

12. The infrared radiation modulator of claim 11, wherein at least one of said conductive layers in each gap, in the marginal zone of said central interferometer plate is subdivided into three segments having identical areas, said segments being disposed at angles of 120° and are usable as capacitors for adjusting the positions of the interferometer plates.

13. The infrared radiation modulator of claim 7, wherein one or both outer surfaces of the interferometer plates have a vaporized filter layer thereon for the range of wavelengths of the radiation to be modulated.

* * * * *